(12) United States Patent
Khosravi (10) Patent No.: US 7,743,245 B2
(45) Date of Patent: Jun. 22, 2010

(54) SECURITY PROTOCOLS ON INCOMPATIBLE TRANSPORTS

(75) Inventor: Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1120 days.

(21) Appl. No.: 11/077,892

(22) Filed: Mar. 10, 2005

(65) Prior Publication Data

US 2006/0206705 A1    Sep. 14, 2006

(51) Int. Cl.
*H04L 29/06* (2006.01)
(52) U.S. Cl. .................. 713/151; 713/168; 713/171; 709/227
(58) Field of Classification Search .................. 713/151, 713/152

See application file for complete search history.

(56) References Cited

U.S. PATENT DOCUMENTS

| | | | | |
|---|---|---|---|---|
| 5,491,800 | A * | 2/1996 | Goldsmith et al. | 709/221 |
| 6,141,698 | A * | 10/2000 | Krishnan et al. | 719/331 |
| 6,959,441 | B2 * | 10/2005 | Moore | 719/328 |
| 7,353,380 | B2 * | 4/2008 | VanHeyningen | 713/150 |
| 7,360,075 | B2 * | 4/2008 | VanHeyningen et al. | 713/151 |
| 2003/0081783 | A1 | 5/2003 | Adusumilli et al. | |

OTHER PUBLICATIONS

International Search Report and Written Opinion from PCT/US2006/008710, mailed Jul. 27, 2006, 12 pgs.

Rescorla, E., et al., "Datagram Transport Layer Security; draft-rescorla-dtls-05.txt," IETF Standard-Working-Draft, Internet Engineering Task Force, IETF, CH, No. 5, Jun. 2004, XP015040212, 26 pgs.

Modadugu, Nagendra, et al., "The Design and Implementation of Datagram TLS," Network and Distributed System Security Symposium (NDSS) Proceedings, Online, Feb. 6, 2004, XP002390018, 13 pgs.

Teong, Chua Seng, et al., "3G Compliant WAP Based System for Medical Data Access," TENCON 2004, 2004 IEEE Region 10 Conference Chiang Mai, Thailand Nov. 21-24, 2004, Piscataway, NJ, USA, IEEE, Nov. 21, 2004, XP010797909, pp. 227-230.

* cited by examiner

*Primary Examiner*—Jung Kim
(74) *Attorney, Agent, or Firm*—Schwabe, Williamson & Wyatt, P.C.

(57) ABSTRACT

"Honest" is a nice word. Sadly, some people in this world are not honest. In an increasingly wired world, dishonest people have found myriad opportunities to illicitly acquire one's confidential data, to monitor or interfere with one's networking activities, e.g., to monitor what you are doing, downloading, accessing, etc., to eavesdrop on or hijack telephony control and voice data or other protocols on your network, etc. To address such risks, typically a secured communication protocol, e.g., TLS or SSL, is utilized to protect communication. Unfortunately, TLS, SSL, and many other security environments require the underlying communication protocol to be TCP/IP, while some protocols needing communication protection, such as VoIP, RTP, SNMP, etc. only operate on UDP and not TCP/IP. Thus, a network shim or other embodiments disclosed herein may be used to allow such UDP based application programs and protocols to use security environments requiring a TCP/IP type transport.

20 Claims, 4 Drawing Sheets

SECURITY PROTOCOLS ON INCOMPATIBLE TRANSPORTS

FIELD OF THE INVENTION

The invention generally relates to enabling secured networking, and more particularly to supporting transport layer security on transports not compatible with the transport layer security.

BACKGROUND

Sadly, some people in this world are not honest. In an increasingly wired world, dishonest people have found myriad opportunities to snoop or otherwise illicitly acquire one's personal or confidential data, such as to monitor one's activities on a network, e.g., to monitor what you are doing, downloading, watching, accessing, etc., to monitor your telephony (e.g., VoIP and equivalents) control and voice data, to monitor and/or interfere with protocols on your network, such as to interfere with SNMP (Simple Network Management Protocol) commands, RTP (Real Time Transport Protocol) data, etc.

To address risk of another's dishonesty, typically secured communication protocols, such as SSL (Secured Socket Layer), TLS (Transport Layer Security), and the like are utilized to protect one communication of one's data. For more information regarding TLS, see, for example, Internet RFCs (Request for Comments) 2246 (The TLS Protocol Version 1.0), 2712 (Addition of Kerberos Cipher Suites to TLS), 2817 (Upgrading to TLS Within HTTP/1.1), 2818 (HTTP Over TLS), 3268 (AES Ciphersuites for TLS), 3546 (TLS Extensions), and 3749 (Protocol Compression Methods). Please note, all RFCs cited herein are available at Internet URL www:ietf:org/rfc. See also the GNU TLS Library [Overview] at URL www:gnu:org/software/gnutls. (Note, to prevent inadvertent hyperlinks, periods in URLs cited herein have been replaced with colons.)

Unfortunately, TLS, SSL, and many other security environments expect an underlying communication protocol to be TCP/IP (Transport Control Protocol/Internet Protocol). Unfortunately, some protocols and application programs, such as VoIP, RTP, SNMP, etc. only operate on an unreliable communication transport such as UDP (User Datagram Protocol) that is not supported by TLS, SSL, and the like. There have been attempts to provide security over unreliable transports such as UDP, for example, the IPSec (IP Security) protocol or SNMPv3 which provides protocol specific security. For more information regarding IPSec, see related RFCs available at www:ietf:org/html:charters/ipsec-charter:html. Unfortunately, these solution attempts suffer from overhead, complexity, as well as protocol-specific limitations, such as having to rewrite a protocol such as SNMP (Simple Network Management Protocol) into SNMP v3 in order to use the security features. Other limitations include, for example, interoperability and deployment issues because of using proprietary, non-standard security solutions for these protocols.

BRIEF DESCRIPTION OF THE DRAWINGS

The features and advantages of the present invention will become apparent from the following detailed description of the present invention in which.

DETAILED DESCRIPTION

The following description describes various embodiments for using a secure transport such as Transport Layer Security (TLS) or the SSL protocol over an unreliable transport such as UDP (User Datagram protocol). For expository convenience, discussion will focus on TLS, a transport layer designed to run on a byte-stream oriented transport providing reliable in-sequence data delivery. However, it will be appreciated TLS and SSL are closely related, and one skilled in the art will know how to apply discussions relating to TLS to SSL and other secure transports. It should be noted that security options do exist for unreliable transports, such as IPSec under UDP. However, IPSec is both a complex protocol and a resource intensive protocol with much overhead. Use of TLS may be more convenient in many circumstances since the protocol is a widely deployed, has good performance characteristics, and advantages over IPSec, such as simpler protocol mechanisms, built-in key exchange, ease of software installation and maintenance, relatively low costs, etc.

However, a significant limitation of TLS is it requires a reliable underlying transport such as TCP and SCTP (Stream Control Transmission Protocol) that is a general purpose transport for message-oriented applications, sometimes used in telephony applications. (For more information on SCTP, see RFCs 2960 and 3436.) But, except for the reliability requirements, the TLS protocol is independent of its transport. The following discussion describes various embodiments to facilitate using TLS over unreliable transports such as the connection-less UDP transport. This in turn facilitates using TLS to provide security to protocols such as SNMP, RTP, VoIP, Radius (Remote Authentication Dial In User Service), etc. (For more information on Radius, see RFC 2865.) These protocols currently define their own complex proprietary security mechanisms, or have no security mechanisms at all (e.g., RTP). By making TLS available over unreliable transports, these protocols can adopt a known standard security transport environment, thus simplifying their design and maintenance.

Figure 1:
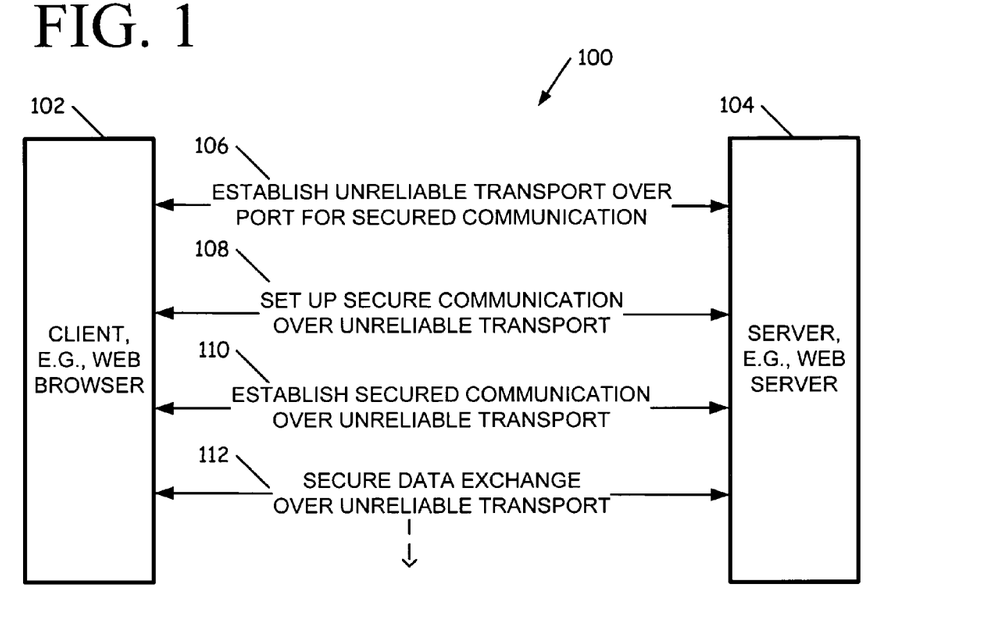
FIG. 1 illustrates according to one embodiment a general overview for utilizing a transport layer security over an incompatible unreliable transport.

FIG. 1 illustrates according to one embodiment a general overview 100 for utilizing a transport layer security compatible with a reliable transport over an incompatible unreliable transport to establish secured communication between a client 102, e.g., a web browser or other machine operating a network application program, and a server 104, e.g., a web server or other machine providing network accessible data or other resources.

The underlying transport is referred to as being "incompatible" if the transport layer security, such as TLS, SSL, OpenSSL, Virtual Private Network (VPN), etc. requires, as discussed above, that the underlying transport reliable, and we are trying to use it over an unreliable transport such as UDP. Typically the reliability requirement of TLS, SSL, etc. is satisfied by requiring the underlying transport to be TCP/IP, which is a reliable protocol. Unfortunately, while TCP/IP provides reliability, it also introduces significant processing overhead and complexity. Disclosed, therefore, is a "reliability delivery layer" (RDL) to interface a transport layer security, such as SSL, with an unreliable transport by making the unreliable transport appear reliable.

In one embodiment, the RDL (see also FIG. 4) provides an interface to (or protocol wrapper for) the unreliable transport such that the RDL adds at least minimally required reliability characteristics of a reliable transport such as TCP/IP required by the transport layer security and shields the transport layer security from recognizing the incompatibility of the unreliable transport. For example, TLS requires minimal reliability features include data corruption detection and data loss detection. The RDL is presumed to wrap or otherwise interface to the unreliable protocol in accord with known techniques to provide the desired compatibility features.

It will be appreciated the RDL may be implemented in a variety of ways, e.g., by way of a protocol wrapper, tunnel, network stack shim, virtual protocol interface to an existing protocol, etc. The end result is the RDL adds at least a minimum reliability functionality to the incompatible unreliable transport such that the combination of the RDL and unreliable transport is a compatible transport. In one embodiment, differences between functionality provided by RDL and that of TCP are that the RDL does not provide congestion control since TLS and SSL do not require it, does not have connection establishment mechanisms since these are already part of TLS/SSL, and does not require a complex TCP state machine. It will be appreciated that the RDL may also remove undesired characteristics of an underlying protocol, such as protocol feature introducing security risks.

As illustrated, before one may establish a transport layer security, one needs to establish 106 an underlying unreliable communication transport, e.g., a UDP based communication session. In the illustrated embodiment, the underlying communication session is established using a communication port to be used by the desired transport layer security. It is assumed the reader is familiar with packet based network communication in which data is broken into packets having a data payload and various header fields, such as an origin network address for a packet (such as the client 102), destination network address for the packet (such as the server 104), and communication port for a communication session (e.g. akin to selecting a particular broadcast channel on a transmitter).

Once the unreliable communication transport is established, a subsequent operation (note, there may be intervening or parallel operations not illustrated) is to set up secure communication over the unreliable transport, e.g., to engage in an initial handshake sequence between a client 102 and a server 104 to negotiate 108 a particular cryptographic cipher to be used during data transfers, establish a session key, exchange or check certificates, etc. Setting up the secure communication assumes the Reliability Data Layer (RDL) makes the incompatible unreliable transport appear to be compatible with the transport layer security.

Once the basic cryptographic characteristics of the secure communication over the unreliable transport have been negotiated 108, a subsequent operation is to establish 110 secured communication over unreliable transport, that is, to complete the set up secure transport layer set up. As soon as the set up negotiation 108 and connection establishment 110 are complete, data can now be securely exchanged 112 over the unreliable transport. Note that TLS and SSL are well suited for a dynamic usage model with mobile devices, since they have a built-in key exchange protocol. And, since they provide provides encryption at the transport layer, they allow for traffic differentiation at the transport layer, which provides ability to setup security associations between applications at fine granularity (e.g., based on the source/destination IP addresses as well as transport port numbers).

Figure 2:
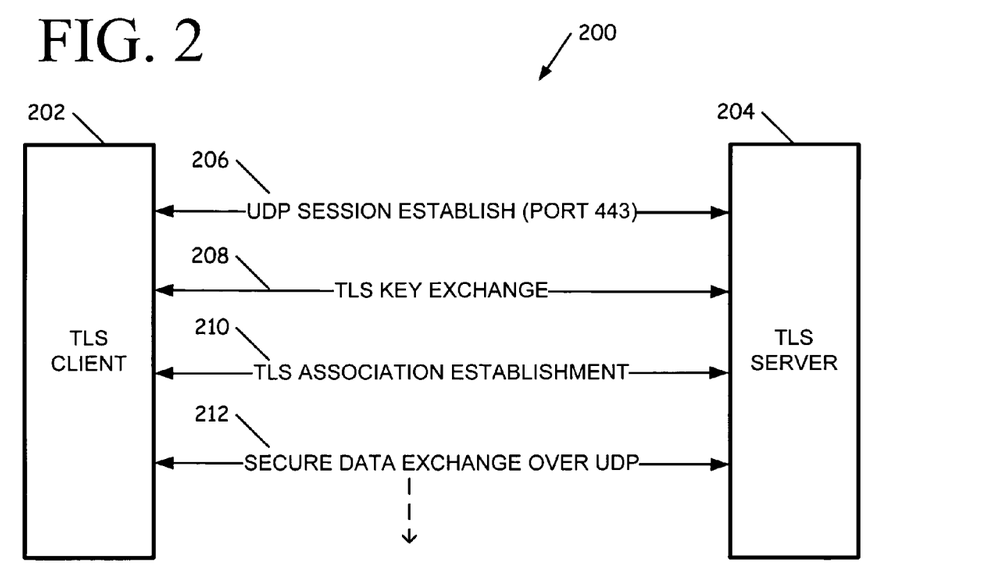
FIG. 2 illustrates according to one embodiment a particular TLS based implementation in accord with FIG. 1.

FIG. 2 illustrates according to one embodiment a TLS based version 200 of the FIG. 1 embodiment for utilizing a transport layer security over an incompatible unreliable transport to establish secured communication between a client, e.g., a TLS client 202, and a server, e.g., TLS server 204.

In the illustrated embodiment, before transport layer security may be established, an underlying unreliable UDP transport is established 206. The UDP transport is established using communication port 443, which is the port SSL expects to use when it negotiates its transport layer security. However, it will be appreciated that while there are many "well known," e.g., expected, communication ports such as those assigned by the Internet Engineering Task Force (IETF) or those used by long-standing convention, it is possible to use an arbitrary port number for TLS over UDP. Once the unreliable UDP transport is established 206, a subsequent operation is to set up secure communication over the unreliable transport. As in FIG. 1, set up includes an initial handshake sequence between the client 202 and server 204 to negotiate 208 the underlying cryptography to protect used during data transfers. In the illustrated embodiment, to establish a TLS session, negotiation 208 includes engaging in a TLS key exchange. A security handshake is necessary to authenticate communication endpoints to each other before any further message exchange may occur.

Once the keys have been exchanged and cryptographic characteristics agreed on by the client 202 and server 204, a subsequent operation is to complete 210 establishing secured communication over unreliable transport. In the illustrated embodiment, completing establishing communication includes TLS association establishment, e.g., peer authentication, etc. As soon as the set up negotiation 208 and connection establishment 210 are complete, data can now be securely exchanged 212 over the unreliable UDP transport.

Figure 3:
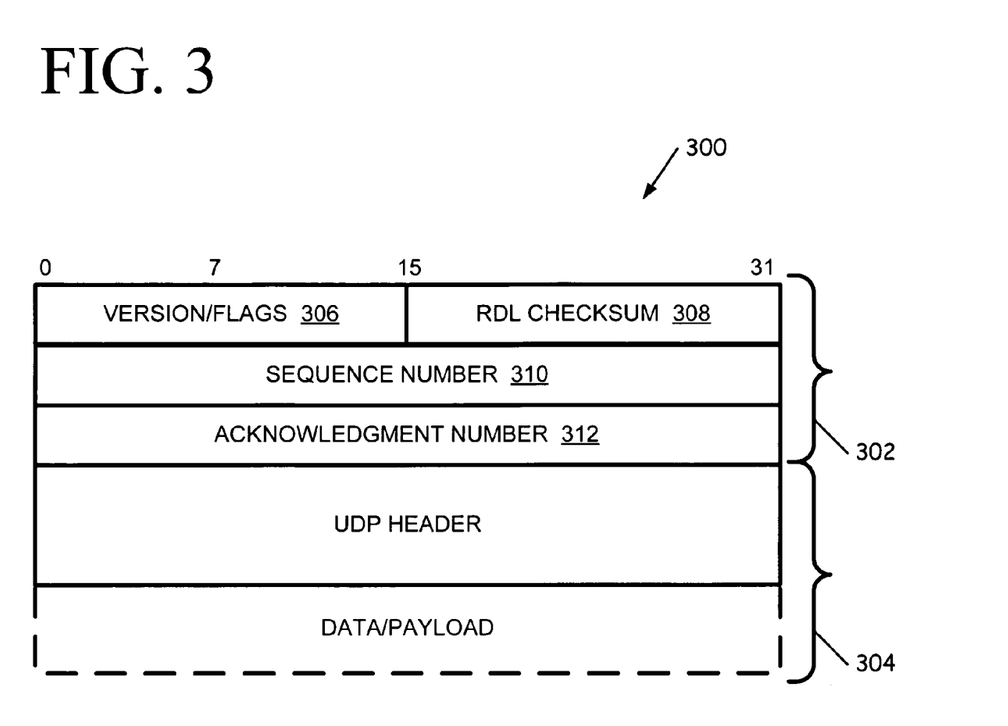
FIG. 3 illustrates an exemplary protocol layering according to one embodiment that can be added to UDP network traffic to satisfy reliability requirements needed by transport layer security protocols such as TLS.

FIG. 3 illustrates an exemplary protocol layering 300 according to one embodiment that can be added to UDP network traffic to satisfy reliability requirements needed by transport layer security protocols such as TLS. In the illustrated embodiment, a Reliability Delivery Layer (RDL) header 302 sits on top of, e.g., wraps or interfaces to, a conventional UDP header and payload 304. As discussed above, the RDL may be used to provide minimal reliability required by TLS or other secure transport layers, such as in sequence delivery, no data corruption, data loss detection and retransmission. The TLS protocol is assumed to be configured to be able to utilize the RDL, e.g., it is presumed bound to a RDL as it would be bound to for use with TCP/IP.

In the illustrated embodiment, the RDL header 302 has a fixed length 12 byte header comprising a 16 bit checksum 308, a 32 bit sequence number 312, a 32 bit acknowledgment number 312 and 16 bit flags 306. In the illustrated embodiment, the RDL checksum 308 corresponds to a TCP checksum and may be used to validate the header and data to protect against data corruption during transmission. This is needed since a UDP checksum is optional. In one embodiment, if a UDP checksum is used, to avoid redundancy, the UDP checksum is removed from UDP network traffic and the RDL checksum used instead. In one embodiment, the sequence number 310 and acknowledgment number 312 have associated timeouts and retransmissions so that data loss may be detected and corrected, and in-order delivery data provided. The RDL header would provide for fragmentation/reassembly requirements of TLS.

In the illustrated embodiment, the 16 bit Version/Flags field 306 comprises 2 bits to specify the version of RDL used to wrap or otherwise interface to an unreliable protocol such as UDP, and 1 bit which may be used an ACK (acknowledgment) flag. The remaining 13 bits may be used for other purposes. Some of these bits could be used, for example, to provide fragmentation/reassembly functionality. In the illustrated embodiment, the RDL is not expected to provide connection establishment mechanisms such as those available in heavier protocols such as TCP. However, while not required by TLS, it will be appreciated the flags 306 could be used to implement connection oriented behavior such as the 3-way handshake used by TCP or the 4-way handshake of SCTP, or to implement a TCP-like window based flow management scheme.

In the illustrated embodiment of the RDL header, there is no length field since it is a fixed length and the UDP header specifies the length of its packet. However, it will be appreciated that the version/flags bits could be used to implement a length field if needed. The sequence number 310 uniquely identifies RDL messages for a particular established 110, 210 communication session. Its initial value may be randomly chosen and incremented for successive messages. In one embodiment, in an effort to prevent illicit interference with a communication session, the initial sequence number is based on an encoding of an identifier associated with one of the communication endpoints and then incremented in a predictable fashion. Received network traffic lacking a properly encoded sequence number may be discarded. As with TCP, the Acknowledgment number 312 is used to denote the last sequence number of the message that was received and is sent in an ACK message. An ACK message is sent for each successfully received message containing data.

Use of the RDL does not require any modifications to the TLS protocol or to the UDP. However, it should be appreciated that TLS could be modified to add the reliability support discussed above for RDL, thus allowing TLS to operate directly over UDP without need to wrap or otherwise interface to UDP as discussed above.

Figure 4:
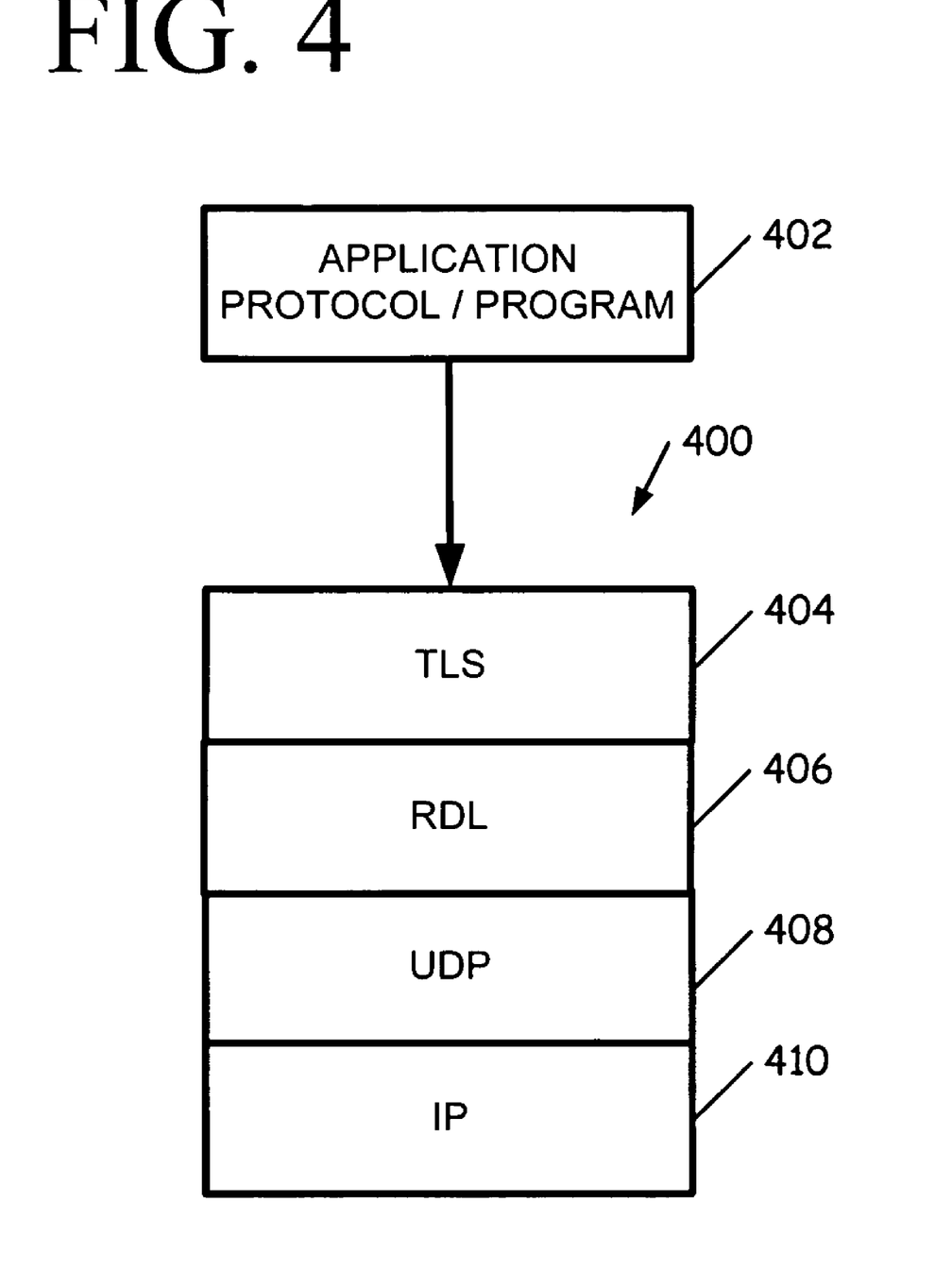
FIG. 4 illustrates an exemplary network protocol stack according to one embodiment.

FIG. 4 illustrates an exemplary network protocol stack 400 according to one embodiment for use by an application 402. It will be appreciated the application may be any application protocol or program communicatively coupled with a network, such as the Real Time Transport Protocol (RTP) used for streaming media, the Simple Network Management Protocol (SNMP), Radius protocol, the Simple Mail Transfer Protocol (SMTP), or a web browser, a data transfer program, etc. As will be understood, data and control from the application 402 travels top-down through the layers 404-410 from one layer to the next. As data travels down the stack, each layer wraps the data handed to it with a header other data (if applicable) and may also (if needed) alter any of the data.

For example, to use the TLS layer, the application 402 would make appropriate calls to a library or Application Program Interface (API) supporting TLS, such as the OpenSSL library (see, e.g., URL www:OpenSSL:org), and the networking components of an operating system would route such application calls to the TLS layer for processing. For an application such as the Real Time Transport Protocol that currently does not support TLS, the application source code can be modified to make appropriate TLS calls, which might be trivial in certain contexts. For example, assuming an application uses standard Linux-type socket calls for network access, e.g., network socket open, read, write, close, etc., to make use of the OpenSSL library which supports both TLS and SSL, the application's socket calls need only be modified to pre-pend a "SSL_" in front of each call in order for the application to support TLS or SSL.

An alternate approach not requiring access to the source code would be to link an intermediate object file or binary output from a compiler against a custom library that has standard network access functions written to support TLS or SSL. Another option would be to modify an executable file directly, or reverse compile one to an intermediate state so that it could be re-linked to support TLS or SSL. Yet another option would be to run an application not supporting a transport layer security in a virtual environment or virtual machine configured to intercept conventional networking calls and replace them with corresponding calls to use of the transport layer security.

Thus, assuming the application 402 supports TLS and a TLS session has already been established, the application would send data that is received by the TLS layer 404 which wraps the data with an appropriate TLS header and then hand it off to the Reliability Delivery Layer (RDL) 406. As discussed above, TLS and other transport layer security protocols need its underlying transport to be reliable, thus as discussed above with respect to FIG. 3, the TLS data is wrapped with an appropriate RDL header and handed off to the unreliable UDP. As discussed above, neither the TLS nor UDP protocols require modification to support the various embodiments disclosed herein, so the UDP simply wraps its conventional header about the data received from the RDL and submits it to the IP (Internet Protocol) layer 410 for delivery over the physical network interface, e.g., a wired network interface (NIC), wireless NIC, etc.

For receipt of data by the machine embodying the application 402, or by the other endpoint to the TLS communication session, this diagram simply operates in reverse, where data received from a NIC is passed to the IP layer 410 which processes and removes its wrapper and hands the remaining data up to the UDP layer 408 which also processes and removes its wrapper and hands the remaining data up to the RDL 406. While the UDP makes no attempt at reliability, the RDL, being a lightweight protocol providing some reliability as discussed above, the RDL can inspect the packets to determine corruption, or to identify missing packets, and appropriately send a request to the other endpoint for retransmission of bad packets, missing packets, etc. packets. Assuming the RDL does not identify a problem with the data, it removes its wrapper and hands the remaining data up to the TLS layer 404 which operates conventionally to process the secured data it has received and hand data off to the application 402. Note that above reference to wrapping or unwrapping data with an appropriate header may include modifying and/or transcoding portions of the data received from a different network stack layer.

Figure 5:
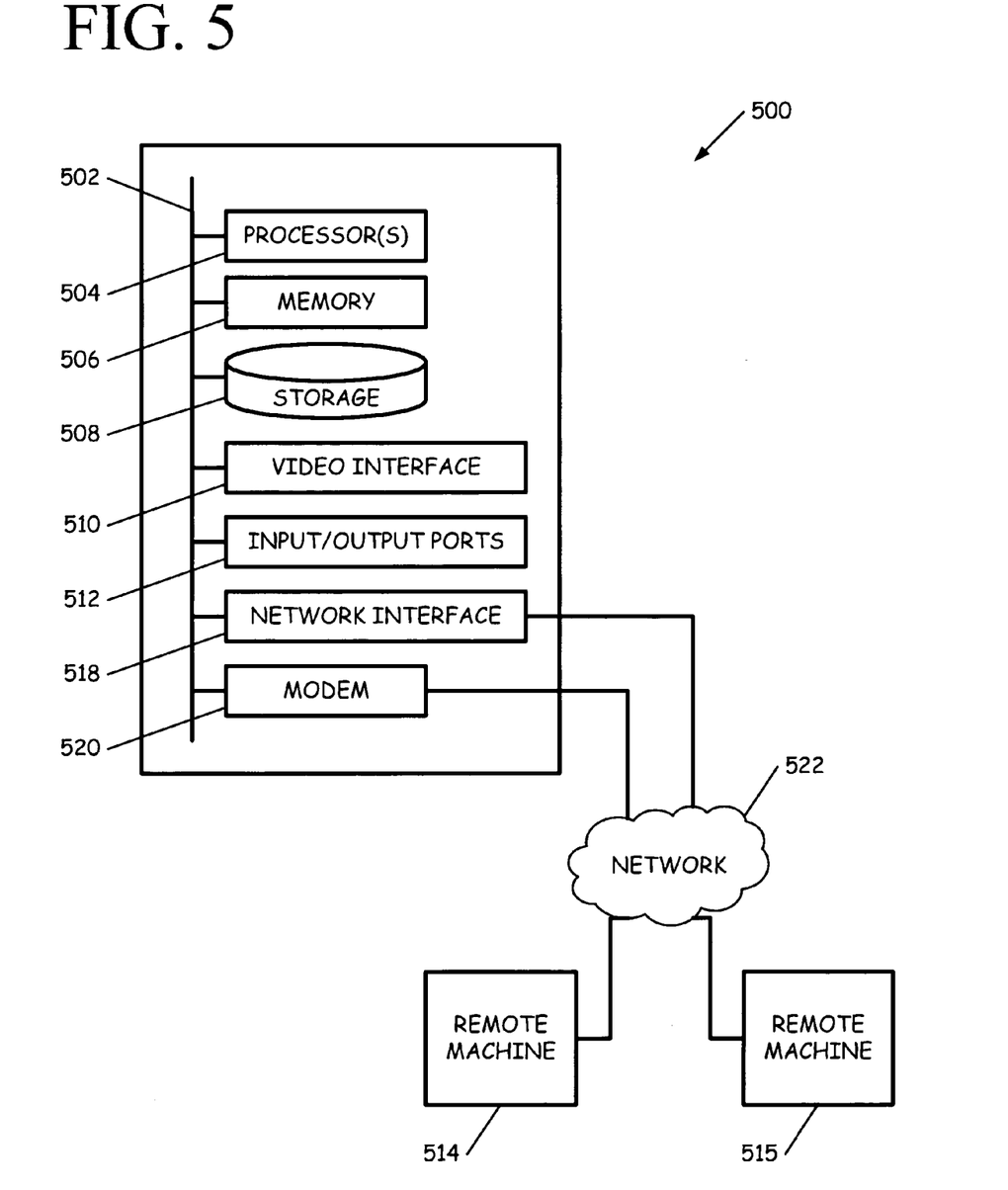
FIG. 5 illustrates a suitable computing environment in which certain aspects of the invention may be implemented.

FIG. 5 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 500 that includes a system bus 502 to which is attached processors 504, a memory 506, e.g., random access memory (RAM), read-only memory (ROM), or other state preserving medium, storage devices 508, a video interface 510, and input/output interface ports 512. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 514, 516, such as through a network interface 518, modem 520, or other communicative coupling. Machines may be interconnected by way of a physical and/or logical network 522, such as the network 112 of FIG. 1, an intranet, the Internet, local area networks, and wide area networks. One skilled in the art will appreciated that communication with network 522 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data such as functions, procedures, data structures, application programs, instructions, etc. which when accessed by a machine results in the machine performing tasks or defining abstract data types or low-level hardware contexts. Associated data may be stored in, for example, volatile and/or non-volatile memory 506, or in storage devices 508 and their associated storage media, including hard-drives, floppy-disks, optical storage, tapes, flash memory, memory sticks, digital video disks, machine-accessible biology-based state preserving mediums, etc. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multi-processor machines. Associated data may be used by or in conjunction with embedded controllers; in the claims that follow, the term "logic" is intended to refer generally to possible combinations of associated data and/or embedded controllers.

Thus, for example, with respect to the illustrated embodiments, assuming machine 500 embodies the TLS client 202 of FIG. 2, then one of the remote machines 514, 516 may be the FIG. 2 TLS server 204. It will be appreciated that remote machines 514, 516 may be configured like machine 500, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for communicating between a first and a second machine, the method comprising:
   providing by the first machine, a reliability delivery layer (RDL) interface to a User Datagram Protocol (UDP) layer on the first machine;
   establishing by the first machine a UDP connection with the second machine; and
   establishing by the first machine, a transport layer security over the RDL interface to the UDP layer on the first machine;
wherein
   the transport layer security is incompatible with the UDP and is separated from the RDL;
   the RDL is configured to make the UDP appear to be compatible with the transport layer security without modification to the transport layer security or to the UDP; and
   the RDL layer comprises a header including a checksum field to emulate Transmission Control Protocol (TCP) checksum used for data protection, a sequence number field and an acknowledgement field to emulate TCP data loss detection and recovery, and a flag field to facilitate TCP like connection oriented behavior management.

2. The method of claim 1, wherein the transport layer security operates in accord with a selected one of the Transport Layer Security (TLS) or Secure Sockets Layer (SSL) protocols.

3. The method of claim 1, further comprising:
   providing, by the first machine, an object file for an application program written to utilize the UDP for communicating between the first and the second machine;
   providing, by the first machine, a link library prepared to utilize networking calls to the transport layer security for engaging in network communication; and
   making, by the first machine, an executable binary for the application program based at least in part on linking the binary object file with the link library.

4. The method of claim 1, wherein the RDL is also configured to provide fragmentation/reassembly functionality.

5. A method for utilizing a transport layer security compatible with a reliable transport over an incompatible unreliable transport, the method comprising:
   providing, by a computing device, a reliability delivery layer (RDL) interface to the unreliable transport, the RDL being separated from the transport layer security and adding selected ones of data corruption detection and data loss detection to the unreliable transport and masking incompatibility of the unreliable transport without modification to the transport layer security or the unreliable transport;
   establishing, by the computing device, a communication session using the unreliable transport; and
   establishing, by the computing device, a secure communication session using the transport layer security over the RDL interface;
   wherein the RDL layer comprises a header including a checksum field to emulate Transmission Control Protocol (TCP) checksum used for data protection, a sequence number field and an acknowledgement field to emulate TCP data loss detection and recovery, and a flag field to facilitate TCP like connection oriented behavior management.

6. The method of claim 5, further comprising:
executing, by the computing device, an application program incompatible with the reliable transport but compatible with the unreliable transport; and
providing, by the computing device, a virtual execution environment mapping networking calls to the unreliable transport to calls to the RDL interface.

7. The method of claims 6, wherein the unreliable transport is in accordance with the UDP (User Datagram Protocol).

8. The method of claim 5, wherein the transport layer security is a selected one of TLS (Transport Layer Security) or SSL (Secure Sockets Layer).

9. The method of claim 5, wherein the unreliable transport lacks in-sequence data delivery, and wherein the RDL provides in-sequence data delivery to the unreliable transport.

10. The method of claim 5, wherein the RDL comprises a protocol wrapper for the unreliable transport.

11. A method for utilizing a transport layer security over an incompatible unreliable transport, comprising:
modifying, by a computing device, a network application program to substitute selected networking calls in the network application program to the unreliable transport with networking calls to the transport layer security;
installing, by the computing device, a reliability delivery layer (RDL) in a network stack above the unreliable transport to masquerade the unreliable transport as a reliable transport compatible with the transport layer security without modification to the transport layer security or the unreliable transport, wherein the RDL is separated from the transport layer security; and
configuring, by the computing device, the transport layer security to utilize the RDL;
wherein the RDL layer comprises a header including a checksum field to emulate Transmission Control Protocol (TCP) checksum used for data protection, a sequence number field and an acknowledgement field to emulate TCP data loss detection and recovery, and a flag field to facilitate TCP like connection oriented behavior management.

12. The method of claim 11, wherein modifying the network application program comprises modifying a source code of the network application program to replace networking calls therein with corresponding calls to the transport layer security.

13. The method of claim 11, further comprising:
establishing, by the computing device, a secure communication session from the network application program over the RDL masquerading the unreliable transport as compatible with the transport layer security.

14. An article comprising a non-transitory machine-accessible medium having one or more associated instructions for communicating between a first and a second machine using the User Datagram Protocol (UDP), wherein the one or more instructions, upon execution by the first machine, results in the first machine performing:
providing a reliability delivery layer (RDL) to interface to a UDP layer on the first machine;
establishing a UDP connection with the second machine; and
establishing a transport layer security over the RDL interface to the UDP layer on the first machine;
wherein the transport layer security is incompatible with the UDP and is separated from the RDL;
the RDL is configured to make the UDP layer appear to be compatible with the transport layer security without modification to the transport layer security or the UDP layer;
the RDL layer comprises a header including a checksum field to emulate Transmission Control Protocol (TCP) checksum used for data protection, a sequence number field and an acknowledgement field to emulate TCP data loss detection and recovery, and a flag field to facilitate TCP like connection oriented behavior management.

15. The article of claim 14, wherein the associated instructions for the transport layer security further include instructions, upon execution of by the machine, results in the transport layer security operating in accord with a selected one of:
the Transport Layer Security (TLS) or Secure Sockets Layer (SSL) protocols.

16. The article of claim 14, wherein the associated instructions further include instructions, upon execution by the first machine, results in the first machine performing:
providing an object file for an application program written to utilize the UDP for communicating between the first and the second machine;
providing a link library prepared to utilize networking calls to the transport layer security for engaging in network communication; and
making an executable binary for the application program based at least in part on linking the binary object file with the link library.

17. An article comprising a non-transitory machine-accessible medium having one or more associated instructions for utilizing a transport layer security compatible with a reliable transport over an incompatible unreliable transport, wherein the one or more instructions, upon execution by a machine, results in the machine performing:
providing a reliability delivery layer (RDL) interface to the unreliable transport, the RDL being separated from the transport layer security and adding selected ones of data corruption detection and data loss detection to the unreliable transport and masking incompatibility of the unreliable transport without modification to the transport layer security or the unreliable transport;
establishing a communication session using the unreliable transport; and
establishing a secure communication session using the transport layer security over the RDL interface;
wherein the RDL layer comprises a header including a checksum field to emulate Transmission Control Protocol (TCP) checksum used for data protection, a sequence number field and an acknowledgement field to emulate TCP data loss detection and recovery, and a flag field to facilitate TCP like connection oriented behavior management.

18. The article of claim 17, wherein the associated instructions further include instructions, upon execution by the machine, results in the machine performing:
executing an application program incompatible with the reliable transport but compatible with the unreliable transport; and
providing a virtual execution environment mapping networking calls to the unreliable transport to calls to the RDL interface.

19. An article comprising a non-transitory machine-accessible medium having one or more associated instructions for utilizing a transport layer security over an incompatible unreliable transport, wherein the one or more instructions, upon execution by a machine, results in the machine performing:
modifying a network application program to substitute selected networking calls in the network application program to the unreliable transport with networking calls to the transport layer security;

installing a reliability delivery layer (RDL) in a network stack above the unreliable transport to masquerade the unreliable transport as a reliable transport compatible with the transport layer security without modification to the transport layer security or the unreliable transport, wherein the RDL is separated from the transport layer security and is configured to inspect packets received and request for re-transmission of missing or corrupted packets; and configuring the transport layer security to utilize the RDL; wherein the RDL layer comprises a header including a checksum field to emulate (Transmission Control Protocol (TCP) checksum used for data protection, a sequence number field and an acknowledgement field to emulate TCP data loss detection and recovery, and a flag field to facilitate TCP like connection oriented behavior management.

20. The article of claim 19, wherein the associated instructions further include instructions, upon execution by the machine, results in the machine performing:

establishing a secure communication session from the network application program over the RDL masquerading the unreliable transport as compatible with the transport layer security.

* * * * *